Patented Aug. 22, 1933

1,923,732

UNITED STATES PATENT OFFICE 1,923,732

NONGELLING LACQUER

Vaughn Kelly, Chicago, Ill., and Charles Bogin, Terre Haute, Ind., assignors to Commercial Solvents Corporation, Terre Haute, Ind., a Corporation of Maryland No Drawing. Application July 29, 1931
Serial No. 553,844

14 Claims. (Cl. 134—79)

The present invention relates to improvements in nitrocellulose lacquers containing basic pigments and esters of monohydroxy monocarboxylic acids. More specifically, the present invention relates to a method for preventing gelling, livering or agglomeration of nitrocellulose lacquers containing basic pigments and solvents such as the esters of lactic acid or oxyisobutyric acid.

It has been known for some time that lacquers containing basic pigments such as zinc oxide and solvents such as ethyl lactate or ethyl oxy-iso-butyrate are subject to a phenomenon which may take the form of either gelation of the entire lacquer or agglomeration of a part of the lacquer into large particles, leaving the remainder of the lacquer as a liquid. The gelling or livering of the lacquer is the more common of the two forms, but even in this case agglomerates may be found in the gelled lacquer. In the case of lacquers containing relatively large amounts of zinc oxide and lactate solvents the gelation often takes place within a week after the preparation of the lacquer and nearly always within a month. Certain factors such as the acidity of the solvent employed, the amount of basic pigment incorporated into the lacquer, the temperature, etc. will determine the speed at which gelation takes place, but in any event, it will be found to occur if these two constitutents are present.

For some time after the gel has first formed it may be destroyed by agitation, but after standing for a period of a few weeks the gel will be found to be more permanent in nature. This phenomenon is obviously very undesirable since it inhibits brushability and necessitates high dilution with thinner before the lacquer may be employed. After gelation the lacquers are found to have poor flow, and the presence of agglomerates gives rise to an uneven film.

Although many efforts have been made in the past to avoid this difficulty which is encountered with lacquers of this type, such efforts until the present time have met with failure. The surprising discovery has now been made that the addition of very small quantities of boric acid, the salts of boric acid or the easily hydrolizable esters of boric acid, will obviate this difficulty. It has been found that in certain cases boric acid or a borate in concentrations as low as .05% of the total weight of the lacquer will prevent gelling or agglomeration of the lacquer. In general, an addition of .1%–1.5% of boric acid or a borate will prevent gelling for a considerable length of time. For example, in laboratory tests using various lacquers containing lactic acid esters and zinc oxide, those in which .05% boric acid was incorporated had not gelled at the end of a two months observation period, whereas those containing no boric acid had gelled or agglomerated badly in every case in less than a month.

It has previously been known that boric acid or a borate will prevent the gelation of bronzing lacquers (copending application Ser. No. 421,869 by Charles Bogin and Vaughn Kelly) but this is an entirely different phenomenon from that under consideration in the present case. In the case of bronzing lacquers it is believed that the gel formation is due to the reaction of the metallic bronze with the nitrocellulose, whereas in the present case it has been shown that the gelation is due at least in part to the reaction of the basic pigment with the acid radical of the solvent employed. Kawashima, United States Patent 1,469,839 and Bowles, British Patent 136,927, have disclosed the use of boric acid or borates to reduce the viscosity of nitrocellulose lacquers. This again is an entirely different problem from the gelation or agglomeration encountered in the present case. The reduction of the original viscosity of the nitrocellulose solution will not avoid the phenomenon which is obviated by the present invention; nor is a rise in viscosity inherent in this phenomenon. It is true that if gelation occurs there will be a very marked rise in viscosity; but if agglomeration takes place without gelation, the viscosity of the liquid portion will be found not to have increased to a great extent; and in any case, all substances capable of reducing the viscosity of the lacquers will not be found to prevent the gelation or agglomeration. It is thus seen that the present phenomenon is entirely distinct from those discussed above, and that the problem of eliminating this difficulty has been solved by the unexpected discovery that small additions of boric acid or a borate will prevent gelation or agglomeration.

The lacquers in which boric acid or other suitable boric acid derivatives can be successfully used as the stabilizing agent may be any of the usual types in which basic pigments and esters of monohydroxy monocarboxylic acids are employed. The nitrocellulose may be the half second type or other suitable low viscosity cottons such as four second cotton. The usual plasticizers such as dibutyl phthalate, tricresyl phosphate or castor oil may be used. Gums such as dammar, ester gum, elemi, or synthetic resins may be incorporated into the lacquers. The solvents may consist solely of esters of monohydroxy monocarboxylic acids such as ethyl lactate, isopropyl lactate, butyl lactate, secondary butyl lactate, amyl lactate, ethyl oxyisobutyrate, etc., or may consist of mixtures of these compounds with other esters or with alcohols, glycols, ketones, ethers, etc. As examples of these latter compounds such materials as ethyl acetate, butyl acetate, butyl propionate, amyl acetate, acetone, diacetone alcohol, monoethyl ether of ethylene glycol, monobutyl ether of ethylene glycol, ethyl alcohol, butanol, or cyclohexanol, may be employed. If alcohols are used in such mixtures they serve to dissolve the gums or to act as "latent solvents". In addition to the solvents, petroleum hydrocarbons such as naphtha, or various gasoline fractions, aromatic hydrocarbons such as benzol or toluol, or turpentine are usually employed to dissolve gums and to serve as cheap diluents.

The boric acid or borate is incorporated into the lacquer generally in proportions of from 1 to 20% of the weight of the cotton (0.1%–1.5% of the total weight of the lacquer). In certain cases, for example, when the amount of basic pigment employed is relatively small, less of the boric acid or borate is required; and in other cases, for example, when the acidity of the solvent is high, greater amounts of the acid or salt will be needed.

Examples

The following are type formulæ for lacquers containing basic pigments and esters of monohydroxy monocarboxylic acids in which boric acid or one of its derivatives is incorporated to prevent gelling, livering or agglomeration:

I

| | Parts |
|---|---|
| Half second cotton | 12 |
| Dammar | 12 |
| Dibutyl phthalate | 8 |
| Zinc oxide | 30 |
| Boric acid | .3–1.5 |

In 100 parts of a solvent mixture consisting of:

| | Percent by volume |
|---|---|
| Ethyl lactate | 20 |
| Butyl acetate | 10 |
| Toluol | 70 |

II

| | Parts |
|---|---|
| Half second cotton | 12 |
| Ester gum | 9 |
| Tricresyl phosphate | 6 |
| Zinc oxide | 30 |
| Borax | .3–1.5 |

In 100 parts of a solvent mixture consisting of:

| | Percent by volume |
|---|---|
| Isopropyl lactate | 40 |
| Xylol | 60 |

III

| | Parts |
|---|---|
| Half second cotton | 12 |
| Glyptal resin ("Rezyl 12") | 20 |
| Dibutyl phthalate | 3 |
| Titanium dioxide | 20 |
| Zinc oxide | 10 |
| Boric acid | .1–.5 |

In 100 parts of a solvent mixture consisting of:

| | Percent by volume |
|---|---|
| Isobutyl lactate | 42 |
| Naphtha (boiling range 140–190° C.) | 58 |

IV

| | Parts |
|---|---|
| Half second cotton | 12 |
| Dammar | 12 |
| Dibutyl phthalate | 8 |
| Zinc oxide | 30 |
| Boric acid | .3–1.5 |

In 100 parts of a solvent mixture consisting of:

| | Percent by volume |
|---|---|
| Normal butyl lactate | 37 |
| Naphtha (boiling range 150–200° C.) | 63 |

V

| | Parts |
|---|---|
| Half second cotton | 12 |
| Ester gum | 9 |
| Tricresyl phosphate | 6 |
| Zinc oxide | 30 |
| Borax | .3–1.5 |

In 100 parts of a solvent mixture consisting of:

| | Percent by volume |
|---|---|
| Ethyl oxyisobutyrate | 30 |
| Butyl acetate | 10 |
| Toluol | 60 |

VI

| | Parts |
|---|---|
| Half second cotton | 12 |
| Dammar | 12 |
| Dibutyl phthalate | 8 |
| Titanium dioxide | 20 |
| Zinc oxide | 10 |
| Boric acid | .1–.5 |

In 100 parts of a solvent mixture consisting of:

| | Percent by volume |
|---|---|
| Butyl oxyisobutyrate | 20 |
| Ethyl acetate | 10 |
| Butyl acetate | 10 |
| Toluol | 60 |

While the exact mechanism whereby boric acid and its derivatives prevent the gelling, livering or agglomeration of lacquers such as those illustrated by the above formulæ is not known, it is probable that rather than entering into a chemical reaction, these compounds merely prevent the reaction product of the basic pigment and the acid radical of the solvent from assuming the physical state of a gel or of large agglomerates. This theory is substantiated in part by the fact that the gelation or agglomeration is prevented equally well by the free acid or by an alkaline salt such as borax. The invention however, is not to be construed as limited to any particular theory by which it may operate.

It is to be understood that while the invention is substantially described by the above disclosure and examples, it is not to be construed as limited to the use of the materials or combinations specifically named. Although zinc oxide was the only basic pigment specified in the examples, the invention is equally applicable to lacquers containing any other basic pigment such as, for example, certain grades of lithopone which have an alkaline reaction. Also, salts of boric acid other than borax, for example the potassium or lithium salts, may be used; the hydrolyzable esters of boric acid such as ethyl, propyl, butyl or benzol esters may be employed; and any mixtures of such compounds with or without free acid may also be used. For example, if an acid or alkaline reaction is undesirable, a neutral mixture of borax and the free acid may be employed.

In addition to the esters specifically mentioned as solvents, other esters, as for example normal propyl lactate, secondary butyl lactate, isoamyl lactate, isopropyl oxyisobutyrate, normal propyl oxyisobutyrate, isobutyl oxyisobutyrate or amyl oxyisobutyrate may be employed.

The invention now having been described, what is claimed is:

1. A method for preventing gelling, livering or agglomeration of nitrocellulose lacquers containing basic pigments and aliphatic esters of acids of the group consisting of lactic and hydroxy butyric acids, which comprises adding to said lacquers at least one material selected from the group consisting of boric acid, esters of boric acid and salts of boric acid.

2. A method for preventing gelling, livering or agglomeration of nitrocellulose lacquers containing zinc oxide and an aliphatic ester of lactic acid which comprises adding to said lacquers at least one material selected from the group consisting of boric acid, esters of boric acid and salts of boric acid.

3. A method for preventing gelling, livering or agglomeration of nitrocellulose lacquers containing zinc oxide and an aliphatic ester of lactic acid which comprises adding to said lacquers .1%–1.5% of at least one material selected from the group consisting of boric acid, esters of boric acid and salts of boric acid.

4. A method for preventing gelling, livering or agglomeration of nitrocellulose lacquers containing zinc oxide and an aliphatic ester of lactic acid which comprises adding boric acid to said lacquers.

5. A method for preventing gelling, livering or agglomeration of nitrocellulose lacquers containing zinc oxide and an aliphatic ester of lactic acid which comprises adding .1%–1.5% of boric acid to said lacquers.

6. A method for preventing gelling, livering or agglomeration of nitrocellulose lacquers containing zinc oxide and an aliphatic ester of lactic acid which comprises adding borax to said lacquers.

7. A method for preventing gelling, livering or agglomeration of nitrocellulose lacquers containing zinc oxide and an aliphatic ester of lactic acid which comprises adding .1%–1.5% of borax to said lacquers.

8. A non-gelling non-agglomerating nitrocellulose lacquer which comprises nitrocellulose, a basic pigment, an aliphatic ester of an acid of the group consisting of lactic and hydroxy butyric acids and at least one material selected from the group consisting of boric acid, esters of boric acid and salts of boric acid.

9. A non-gelling non-agglomerating nitrocellulose lacquer which comprises nitrocellulose, zinc oxide, an aliphatic ester of lactic acid and at least one material selected from the group consisting of boric acid, esters of boric acid and salts of boric acid.

10. A non-gelling non-agglomerating nitrocellulose lacquer which comprises nitrocellulose, zinc oxide, an aliphatic ester of lactic acid and .1%–1.5% of at least one material selected from the group consisting of boric acid, esters of boric acid and salts of boric acid.

11. A non-gelling non-agglomerating nitrocellulose lacquer which comprises nitrocellulose, zinc oxide, an aliphatic ester of lactic acid and boric acid.

12. A non-gelling non-agglomerating nitrocellulose lacquer which comprises nitrocellulose, zinc oxide, an aliphatic ester of lactic acid and .1%–1.5% of boric acid.

13. A non-gelling non-agglomerating nitrocellulose lacquer which comprises nitrocellulose, zinc oxide, an aliphatic ester of lactic acid and borax.

14. A non-gelling non-agglomerating nitrocellulose lacquer which comprises nitrocellulose, zinc oxide, an aliphatic ester of lactice acid and .1%–1.5% of borax.

VAUGHN KELLY.
CHARLES BOGIN.

CERTIFICATE OF CORRECTION.

Patent No. 1,923,732.  August 22, 1933.

VAUGHN KELLY, ET AL.

It is hereby certified that error appears in the printed specification of the above numbered patent requiring correction as follows: Page 1, line 58, for ".05%" read ".5%"; and that the said Letters Patent should be read with this correction therein that the same may conform to the record of the case in the Patent Office.

Signed and sealed this 24th day of October, A. D. 1933.

F. M. Hopkins (Seal) Acting Commissioner of Patents.